Jan. 15, 1929.                    1,699,289

M. S. GLEASON

EDUCATIONAL APPLIANCE

Filed Dec. 17, 1926            6 Sheets-Sheet 1

INVENTOR:
Michael S. Gleason,
BY HIS ATTORNEY

Jan. 15, 1929.

M. S. GLEASON

EDUCATIONAL APPLIANCE

Filed Dec. 17, 1926

INVENTOR:
Michael S. Gleason,
BY HIS ATTORNEY

Patented Jan. 15, 1929.

1,699,289

UNITED STATES PATENT OFFICE.

MICHAEL S. GLEASON, OF NEW YORK, N. Y., ASSIGNOR TO ROWENA S. GLEASON, OF NEW YORK, N. Y.

EDUCATIONAL APPLIANCE.

Application filed December 17, 1926. Serial No. 155,379.

My improvement relates to educational appliances, one object being to facilitate the teaching of addition and subtraction to beginners, by providing mechanical means of ascertaining the correctness or incorrectness of solutions of problems involving any two of the eleven fundamental values 0 to 10, both inclusive, by affording the zest of a "guessing game" to the process of determining correct solutions, thereby promoting ability to arrive at correct solutions by deduction, and awakening interest in intellectual problems by facilitating acquisition of knowledge.

To this end the invention consists in the specific construction, combination, and arrangement of parts and appurtenances described and claimed, whereby these and other desirable results are attained, distinctive features being the means by which a problem of addition or one of subtraction is solved through the operation of indicators setting the problem; the means coacting with the indicators: and the means by which the obtaining of the correct solution results in the means by which this equivalence results in the manifestation of a signal upon the operation of a trip lever which cannot otherwise cause the signal to be observed, and the means by which the nature of the operation, whether addition or subtraction, is visually indicated to the operator, all as hereinafter fully set forth.

In the accompanying drawings I illustrate a practical embodiment of the essential features of my invention and contrivance as adapted to the production of a practical commercial commodity in the form of a toy calculator, although I do not limit myself to the identical form and construction of parts and appurtenances herein shown by way of exemplification, since changes in minor details may be made, and equivalent mechanical expedients resorted to, with similar results and without departing from the spirit and intent of my invention.

With this understanding:—

The three principal factors in my apparatus are the initial-minuend number indicator plate A, the additive-subtrahend indicator plate B, and the solution indicator plate C, controlled respectively by manual means such as pinions $a$, $b$, $c$ rotatable by extraneous means, as by the knobs $a'$, $b'$, $c'$ mounted in front of the plate F of the casing, adjacent to the sight openings $f'$, $f^2$, $f^3$ provided in said front plate for the display of the numerals on said plates A, B, C,— these knobs $a'$, $b'$, $c'$ being the only parts protuberant from the casing except the end of the signal lever T by means of which the solution signal E is actuated. The sight aperture $f^4$ in the front plate F is for the display of the symbols on the arithmetical problem indicator or index plate. In this connection Figs. 1 and 2 may be referred to as illustrating the simplicity of my calculator as viewed externally, the protuberant parts being reduced to a minimum and being unobtrusive.

The numeral indicator plates A, B, C are slidably mounted on parallel guide ways $G'$, $G^2$, $G^3$ affixed to the rear side of the front plate F and between it and said guide ways, although this means of support is not an essential feature of my invention, which contemplates broadly the slidable and parallel mounting of said indicator plates in close proximity to the rear side of said front plate F, so that the numerals on said indicator plates may be viewed consecutively through the aforesaid sight openings $f'$, $f^2$, $f^3$ when brought into coincidence therewith.

Figure 3:
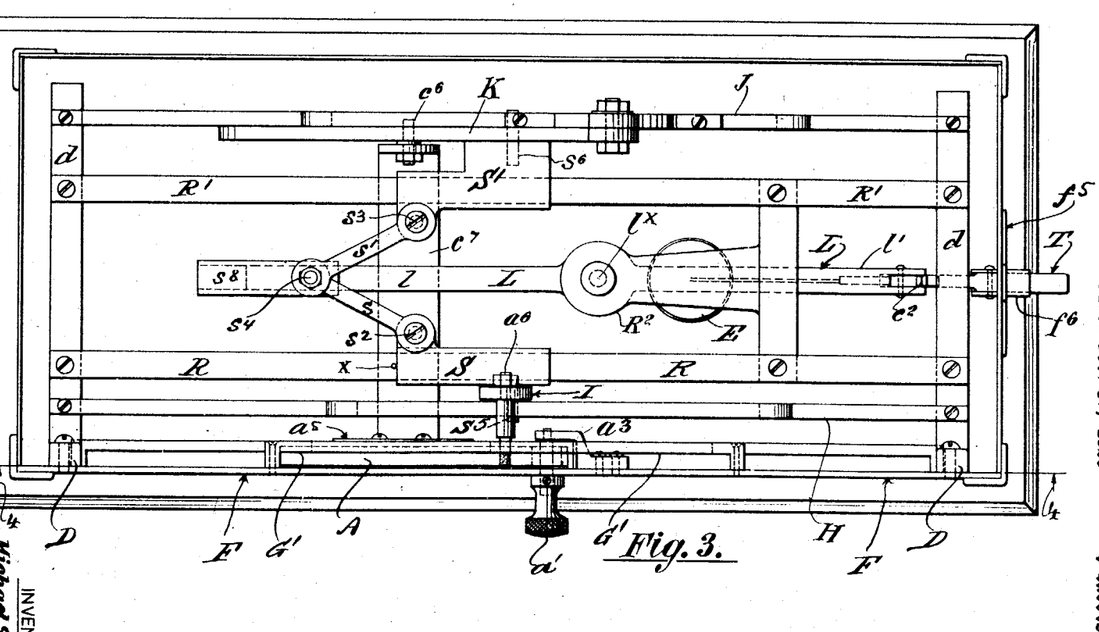
Fig. 3 is an enlarged top view of the apparatus with the cover plate removed.
Figure 4:
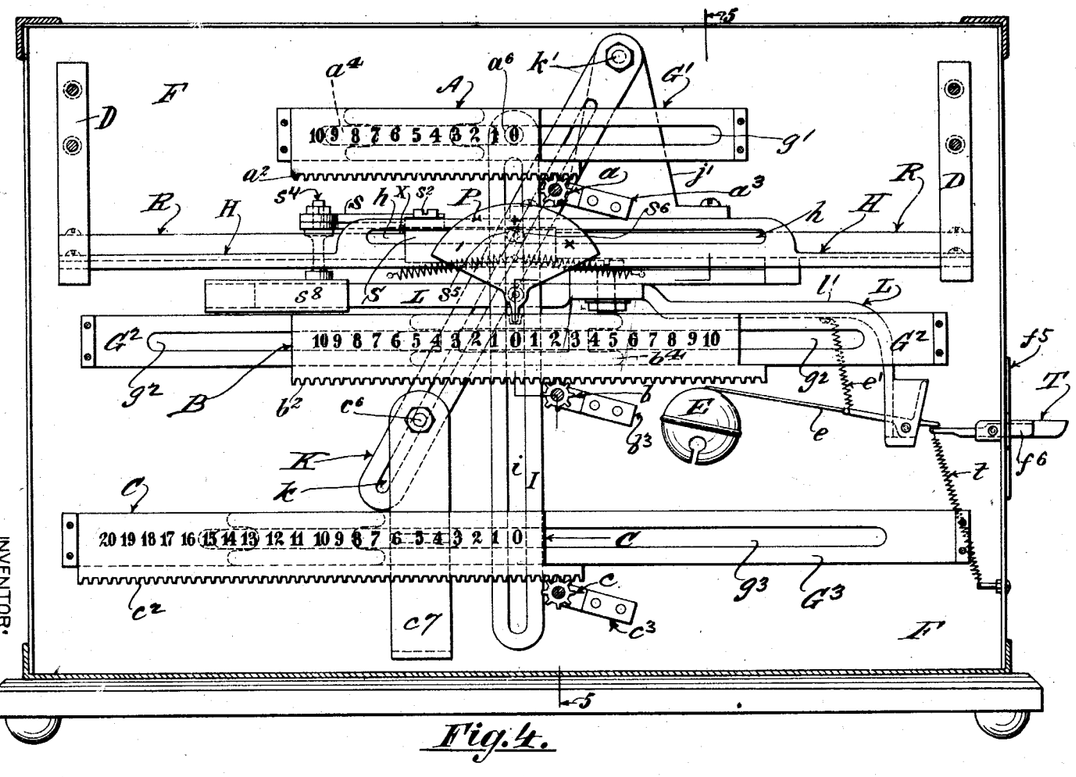
Fig. 4 is an elevation of the operative parts taken upon plane of line 4—4, Fig. 3, with the operative parts in the position occupied but not disclosed in Fig. 1, otherwise than through the sight openings in the front plate.
Figure 5:
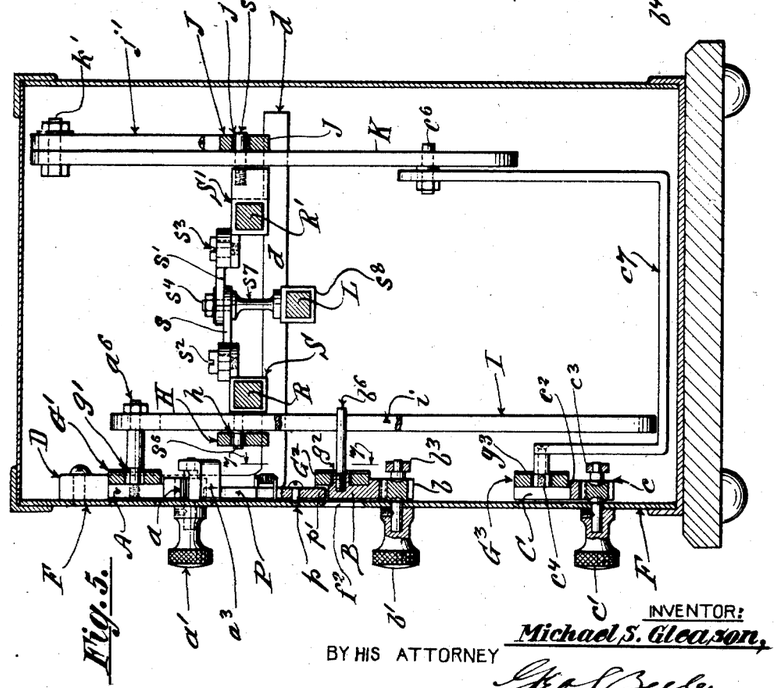
Fig. 5 is a transverse sectional elevation taken on the plane of line 5—5, Fig. 4.

Considering the initial-minuend number indicator and referring more particularly to Fig. 4, it will be understood that the face thereof adjacent to the plate F bears the eleven fundamental numerals 0 to 10 inclusive, in inverse order, or reading from right to left. The lower edge of the plate is formed with rack teeth $a^2$ which mesh with the pinion $a$ in the bearing bracket $a^3$ secured to the rear side of the plate F, as shown in Figs. 3 and 5. The axle extends through the plate F to said pinion $a$ and is provided with the knob $a'$.

The back of the plate A is formed with a longitudinal tenon $a^4$ which fits in the slot $g'$ of the stationary guide way G', the latter being secured to the rear of the plate F.

A spring tension plate $a^5$ is attached to the rear side of the tenon $a^4$ and bears against the rear side of the guide way G' to obviate looseness or play between the parts.

In like manner a longitudinal tenon $b^4$ on the back of the additive-subtrahend number indicator plate B fits in a slot $g^2$ in the stationary guide way $G^2$ which is also affixed to the rear side of the plate F. The lower edge of said plate B is formed with rack teeth $b^2$ to mesh with the pinion $b$ journaled in the bearing bracket $b^3$, which is likewise secured to the rear side of the plate F. The arbor of the pinion $b$ extends through the said plate F and has secured to it the knob $b'$.

A spring tension plate $b^5$ is attached to the rear side of the tenon $b^4$ and bears against the rear side of the guide way $G^2$ to obviate looseness and insure proper alignment of the plate B.

This additive-subtrahend number indicator plate B is considerably longer than the initial-minuend indicator plate A and bears upon its face adjacent to the plate F as shown in Fig. 4, two series of numerals, reading from left to right, from 10 to 0 inclusive, the latter being positioned centrally on the face of the plate B, and the numerals 1 to 10 inclusive, extending to the right from 0 to the numeral 10.

The solution indicator plate C is slidably mounted on the guide way $G^3$, also rigidly affixed to the rear side of the plate F and formed with the longitudinal slot $g^3$ for the accommodation of the longitudinal tenon $c^4$ on the back of said plate C, a spring tension plate $c^5$ being attached to said tenon and bearing against the rear side of the guide way $G^3$ to insure proper alignment of the plate C. The lower edge of said plate C is formed with rack teeth $c^2$ which mesh with the pinion $c$ journaled in the bearing bracket $c^3$ secured to the rear side of the plate F, the arbor of said pinion $c$ being provided with the knob $c'$.

The face of the plate C adjacent to the plate F bears twenty-one numerals 0 to 20 arranged consecutively to read inversely from left to right.

Figure 7:
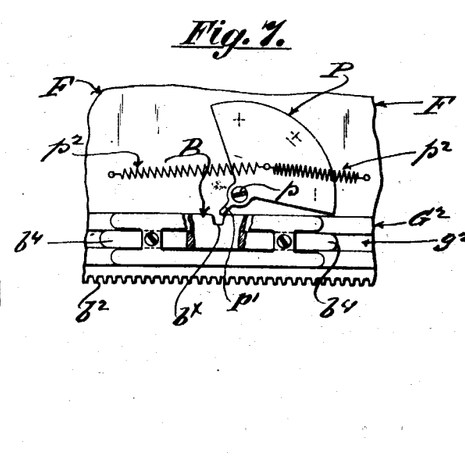
Fig. 7 is a detail view of the index plate.

The indicator or index plate P is pivotally supported at $p$ on the rear side of the plate F, as shown best in Fig. 7, which represents a rear view of the indicator P and adjacent parts. Said pivot $p$ is positioned in the plane of the centers of the sight openings in said front plate, and the indicator consists preferably of a segmental plate on the front surface of which are the symbols plus, $+$, plus or minus, $\pm$, and minus, $-$,—the symbols being equidistant angularly as related to the pivot and with the plus or minus symbol, $\pm$, intermediate of the other two. Said index plate P is formed with a tooth $p'$ adjacent to its pivot $p$, which tooth is adapted to engage in a notch $b^x$ formed in the upper edge of the additive-subtrahend number indicator plate B. See Figs. 4 and 7, in which latter the index plate P is shown as rocked to one side by the shifting of the plate B, and into such position that the $+$ symbol shall be visible through the sight opening $f^4$ in the front plate F. Retractile springs $p^2$ attached to the back of the plate F and to the index plate P tend constantly to cause said plate P to assume the medial position shown in Fig. 4, while admitting of its being rocked in either direction by the reciprocation of the plate B, so as to display alternately either the symbol $+$ or the symbol $-$ through the sight $f^4$, according to incidental prescribed conditions of operation.

Figure 1:
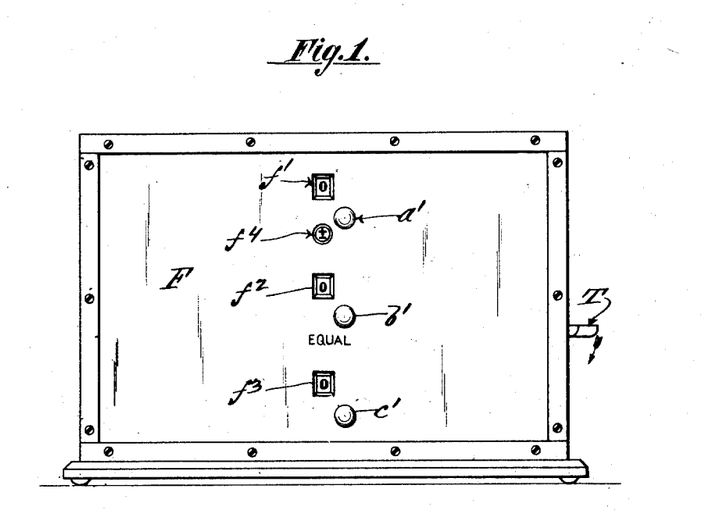
Figure 1 is a front elevation of my apparatus.
Figure 2:
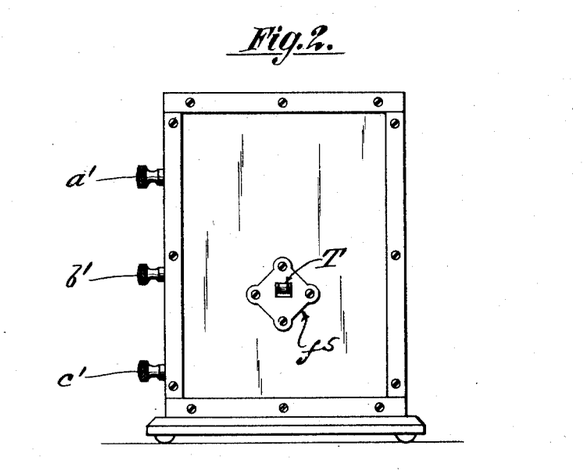
Fig. 2 is an elevation of the right hand end thereof.

The engagement of the tooth $p'$ of the indicator P in the notch $b^x$ occurs only when the additive-subtrahend number indicator plate B exhibits at the sight opening the numeral zero, in which position the symbol $\pm$ is exhibited at the sight opening as in Fig. 1. When said plate B is moved from that position, either to the right or the left, the sides of the notch acting on the tooth tilt said plate P to the left or right respectively, the tilting being completed when the numeral 1 is exhibited at the sight opening $f^2$, after which the tooth $p'$ rides along the top of the plate B until reversal of the latter again brings the tooth $p'$ and notch $b^x$ into coincidence,—the springs $p^2$ yielding to the tilting of the plate P, and the passage of the plate B thereunder while insuring engagement between the tooth and the notch when coincident.

Figure 6:
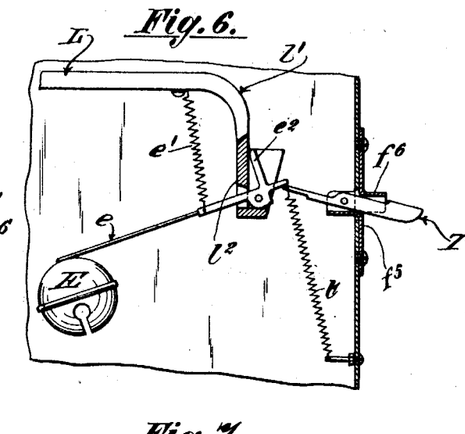
Fig. 6 is a detail view of the signal or announcing device.

R, R' are longitudinal track rails parallel to the guide ways G', $G^2$, $G^3$ and rigidly supported at their extremities, as by being secured to the horizontal members $d$ of the transverse brackets D, the vertical members of which are rigidly attached to the back of the plate F. On these track rails R, R' are mounted slides S, S' to which are connected a pair of links $s$, $s'$ by pins $s^2$ and $s^3$, the adjacent ends of the links being connected at the medial or joint pivot $s^4$ positioned upon and forming part of a post $s^7$, (see Fig. 5), the lower portion of which is rigidly united with a sleeve $s^8$ slidable on the rear end of arm $l$ of the signal lever L, on the forward arm $l'$ of which the signal device E is mounted as shown in Fig. 6, said signal lever being fulcrumed at $l^x$ midway between the rails R and R' and on a bracket $R^2$ rigidly attached to and between the track rails. Said lever L, being swingable in a horizontal plane parallel to the track rails R, R', its horizontal angular position is determined by its fulcrum $l^x$ and said sleeve $s^8$.

Interposed between the stationary guide way G' and the track rail R, and parallel thereto, is a guard bar H, the ends of which are rigidly attached to the aforesaid horizontal members $d$ of the brackets D. This guard bar H is formed with a slot $h$ for the reception of a stud $s^5$ protuberant from and perpendicular to the adjacent side of the slide S, said stud $s^5$ also extending through the slot $i$ in the shift lever I suspended from a fulcrum stud $a^6$ forming a rigid part of the initial-minuend number indicator plate A.

A stud $b^6$, forming a rigid part of the additive-subtrahend number indicator plate B, also extends into said slot $i$ in the shift lever I, as shown in Fig. 5. Said shift lever being movable in a plane parallel to that in which the indicator plates A, B, C are movable, its position is at all times determined by the position of the studs $a^6$ and $b^6$ and determines, in turn, the position of the stud $s^5$.

At the rear of the apparatus and parallel to the track rail R' is another guard bar J, also affixed to and between the horizontal members $d$ of the brackets D and formed with a longitudinal slot $j$ for the reception of a stud $s^6$ also extending through a longitudinal slot $k$ in the shift lever K which is suspended from a fulcrum $k'$ mounted on a standard $j'$ affixed to the top of said guard bar J. Another stud $c^6$ also projects into said slot $k$, said stud $c^6$ being affixed to a U-shaped arm $c^7$ rigidly attached to the solution indicator plate C. (see Fig. 5). The shift lever K, being movable in a plane parallel to that in which the indicator plates A, B, C are movable, its position is at all times determined by the position of the fulcrum $k'$ and the stud $c^6$, and determines, in turn, the position of the stud $s^6$. The function of the longitudinally slotted guard bars H and J, acting through the medium of the studs $s^5$, $s^6$, is simply to facilitate the sliding of the slides S, S' on their rails R, R' and they are not essential to the operation of the device.

Figure 9:
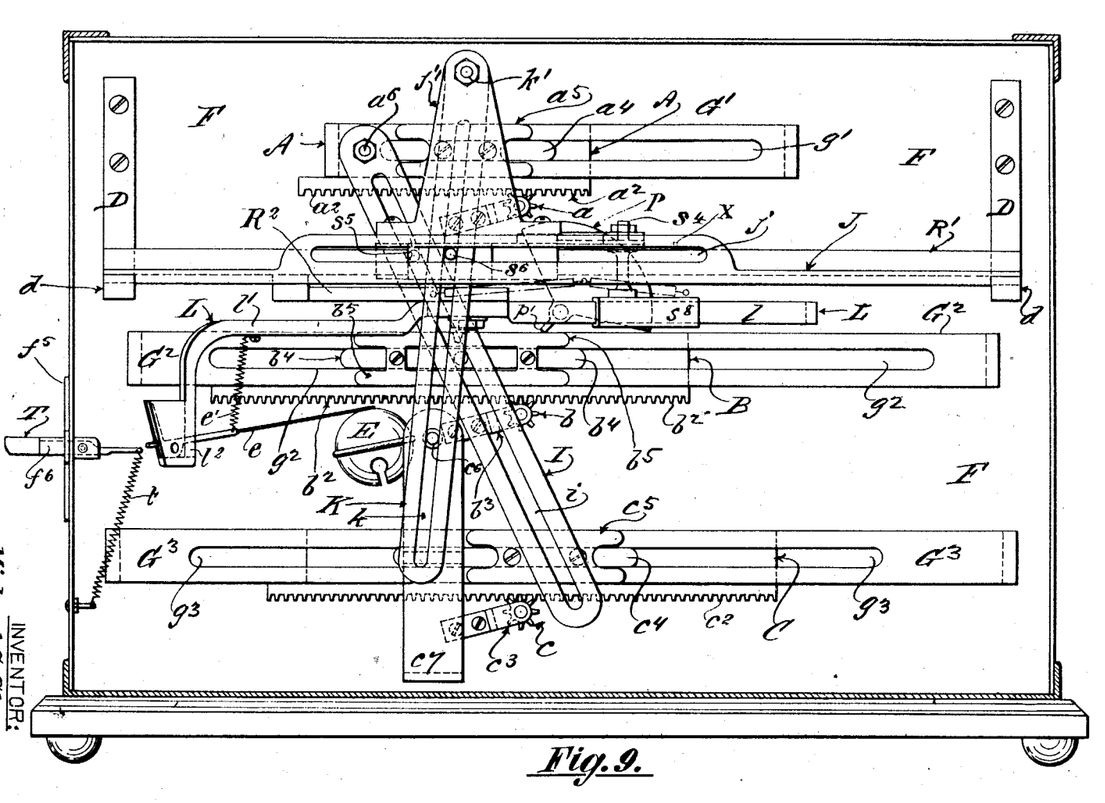
Fig. 9 is a rear elevation of the operative parts taken upon the plane of line 9—9, Fig. 8.

The signal device E may be of any suitable nature such as a bell or its equivalent, adapted to sound or be made manifest when actuated as by the lever T. Thus, as shown, said lever T is fulcrumed on a bracket plate $f^5$ secured to the right end wall of the casing. Normally said lever T is held in horizontal position against a stop $f^6$ by means of a retractile spring $t$ attached to its inner arm and to a stationary part, against the resistance of which spring it may be rocked to trip the lever $e$ on which the signal device E is mounted, when the two levers T, $e$ are in the same plane. See Fig. 6 from which it will be seen that the signal lever $e$ is fulcrumed on the lower portion of the forward end of the lever L and is connected with a retractile spring $e'$ tending constantly to hold the lever $e$ against a shoulder $l^2$ on the forward arm $l'$ of the lever L, and in the position shown in Figs. 4 and 9. When rocked by the trip lever T, as shown in Fig. 6, a toe $e^2$ on the signal lever contacts with the adjacent portion of the lever L to limit the extent of motion of the parts, the retractile springs $e'$, $t$ returning said parts to their normal position when the trip lever T is released.

It is important to note that the relative position and arrangement of the operative parts hereinbefore described are as follows: The guide ways G', $G^2$, $G^3$ are parallel and so spaced with reference to each other that the numerals on the plates A, B, C may be exhibited through the vertically aligned sight apertures $f'$, $f^2$, $f^3$, Fig. 1, when $f^2$ is equidistant from $f'$ and $f^3$. The pivot of the index plate P is so placed in the plane of the centers of the sight openings $f'$, $f^2$, $f^3$ that the symbols on the index plate may be exhibited through the sight opening $f^4$ when vertically aligned with the openings $f'$, $f^2$, $f^3$.

The track rail R is so positioned that the stud $s^5$ is at all times equidistant from the fulcrum stud $a^6$ and the stud $b^6$, as shown in Fig. 5. The track rail R' is so positioned that the stud $s^6$ is at all times equidistant from the fulcrum $k'$ and stud $c^6$. The relative arrangement of the parts is such that only one numeral as depicted on the indicator plates A, B, C, respectively, may be exhibited at each of the sight openings $f'$, $f^2$, $f^3$, and one and only one arithmetical problem symbol may be exhibited at the sight opening $f^4$. For which reason a problem in addition or subtraction, as indicated at the sight opening $f^4$ and a proposed solution thereto are capable of being presented in a view of the exterior front face, and the signal device will indicate the correctness of such proposed solution in the manner hereinafter explained. For convenience in description reference will be made to that arrangement of operating parts by which the problem presented in a view of the exterior front face is $0 \pm 0$ and the proposed solution is 0, as the initial position of such operating parts. With this understanding, the pins $s^2$ and $s^3$, as shown in Figs. 3 and 4, are in their initial position and are on a line perpendicular to the rails R and R'. In said initial position of the pins the lever L is held by the fulcrum $l^x$ and the sleeve $s^8$ in a position parallel to the track rails R and R', and only in this position of the lever L is it in such juxtaposition to the trip lever T that the rocking of the latter will trip and rock the lever $e$ and make manifest the signal device E. When, however, the pins $s^2$ and $s^3$ have been moved an equal distance from their initial position a similar condition prevails and the signal may be noted. The numerals on the indicator plates A, B, C are identical in size and spacing on each plate and relatively on the three plates (see Fig. 4). The indicator plates A and C can move in but one direction from their initial position, but the indicator plate B is movable in both directions.

From the foregoing specific description of the mechanism, the manner of operation thereof may be briefly summarized as follows:

Assuming that the device is so adjusted, by manipulation of the knobs $a'$, $b'$, $c'$, as to display 0's at all the openings or windows $f'$, $f^2$, $f^3$, the indication will be as is shown in Fig. 1 with the sign $\pm$ visible at the window $f^4$, as a result of the adjustment of the slide B to its mid position as shown in Fig. 4. The knob A' may now be rotated to the right or clockwise to cause the slide A to move to the right to bring any desired number from 1 to 10 into view at the window $f'$. If a number is to be added to the number thus shown at the uppermost window, the knob $b'$ will be rotated in a clockwise direction, shifting the slide B to the right so as to disclose at the window $f^2$ the number to be added to the number disclosed above it. This movement of the slide B toward the right will cause the shifting of the index plate P to the left, disclosing the + sign at the window $f^4$. The indication thus far is then a simple problem in addition, the number at the window $f^2$ to be added to the number shown in the window $f'$, the + sign at $f^4$ being an arithmetical expression of the problem. The word "equal" appearing on the face of the instrument below the second number, or the mathematical sign of equality if preferred at the same place, leads to the expression of the result or answer to be indicated in the lowermost window $f^3$. The operator now turns $c'$ in a clockwise direction far enough to display in the lowermost window what he believes to be the result of the addition indicated above. If he is correct in his adjustment of the slide C, bringing the proper numerical answer to view, the operation of the internal mechanism as already explained will establish such correlation between the trigger mechanism at T and the signal mechanism as to cause the signal to be made manifest when the lever T is depressed as shown in Fig. 1. If, however, the adjustment of the slide C is not correct, the signal mechanism can not be operated and consequently the operator will know that his result is incorrect. If a problem in subtraction is contemplated instead of one in addition, the knob $b'$ is rotated in a counter clockwise direction, causing the slide B to move to the left from its normal or mid position and the index plate P will consequently be thrown over to the right bringing the $-$ sign into view at the window $f^4$. The operator will thus adjust the slide B as far to the left as necessary to bring into view at the window $f^2$ the desired subtrahend number, which of course as explained below can never be greater in positive value than the minuend number already displayed at the window $f'$. The manipulation of the answer slide C will be as before with a movement of the knob $c'$ in a clockwise direction.

Figure 8:
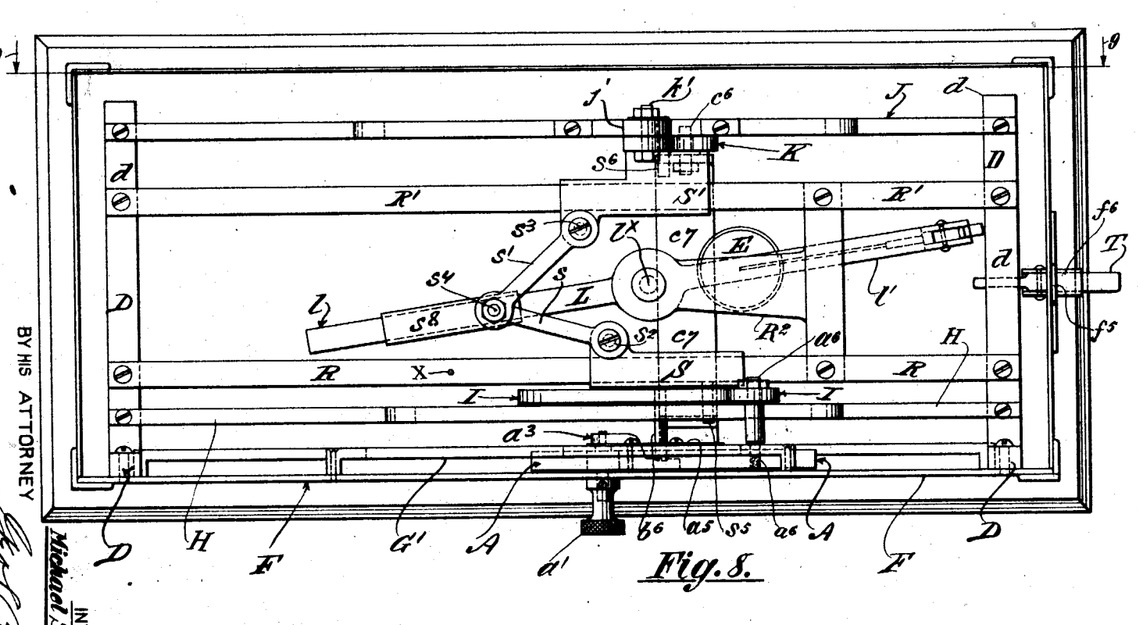
Fig. 8 is a view similar to Fig. 3, showing a plan of the operative parts in a different position.

As the indicator plates A, B, and C are moved from their initial position (assuming a movement of the indicator plate B in the same direction as plates A and C, whereupon the symbol + would be exhibited at $f^4$,) to exhibit a problem in addition and a solution thereto, the solution exhibited will be correct only when the distance through which plate C has been moved is equal to the sum of the distances through which plates A and B have been moved. The studs $a^6$ and $b^6$ will have been moved from their initial position distances equal to those through which the plates A and B have been moved. The stud $s^5$ will, through the movement of the shift lever I, by studs $a^6$ and $b^6$, have been moved a distance from its initial position and in the direction of the movement of A and B, equal to one half the sum of the distances through which A and B have been moved (on an application of the principle of plane geometry that the opposite sides of a parallelogram are equal and that in similar triangles (with equal angles) corresponding sides are proportional. Likewise, the stud $s^6$ will, through the movement of the shift lever K, by fulcrum $k'$ and stud $c^6$, have been moved a distance from its initial position and in the direction of the movement of plate C equal to one half the distance through which plate C has been moved on an application of the principle of plane geometry that in similar triangles corresponding sides are proportional. Since, therefore, the correct solution is shown only when plate C has been moved from its initial position a distance equal to the sum of the distances through which plates A and B have been moved from their initial position, the studs $s^5$ and $s^6$ will have been moved equal distances from their initial position and, in consequence, the studs or pins $s^2$ and $s^3$ will again be on a line perpendicular to the rails R and R', and contactual engagement of levers T and $e$ can be made and the signal device thereby made manifest. Conversely, when the correct solution is not shown the signal device can not be operated (as in Figs. 8 and 9).

The operation in subtraction is in all respects similar except that the plate B is moved from its initial position in the opposite direction from the direction of movement of the plates A and C, and in consequence the solution arrived at and exhibited will be correct only when the distance through which plate C has been moved is equal to the difference of the distances through which plates A and B have been moved as expressed in the net distance from its initial position through which stud $s^2$ has been moved; for the movement of the fulcrum stud $a^6$ to the right will move stud $s^2$ to the right, while the movement of the stud $b^6$ to the left will move stud $s^2$ to the left, and point of rest of stud $s^2$ being a distance from its initial position equal to one-half the difference of the distances of the two plate movements. It is to be noted that stud $s^2$ will again be in its initial position when the two distances the plates A and B are moved in opposite directions are equal. That is to say, when the subtrahend number (indicated on plate B) is equal to the minuend number (indicated on plate A) in which case 0 is the correct solution. If a larger subtrahend number should be shown without increasing the minuend correspondingly it would confuse the beginner with minus-zero values. To confirm, therefore, the elemental concept of absolute zero and to negative the idea that from a boy with seven apples, for example, more than seven apples can be taken away, the stop pin $x$, (Figs. 3, 4, and 8), is inserted in the rail R to limit the movement of the slide S and the toggle pin $s^2$ in the direction of minus-zero values to their initial or zero position, and prevent a position thereof indicative of a difference less than zero. The movement of the toggle pin $s^3$ is limited in the direction of minus-zero values to its initial or zero position by the co-operation of the solution indicator plate C with the supports of the guide way $G^3$, as shown in Fig. 4. The subtrahend indicator plate, therefore, cannot be moved to indicate a larger number than that indicated by the minuend indicator plate A. The movement of the subtrahend indicator plate from its initial position in a direction opposite to that in which the minuend indicator plate A may be moved from its initial position causes, at its inception, the index plate P to exhibit the symbol for subtraction (—), in the manner above described.

This apparatus being designed for both adding and subtracting calculations, for convenience of description the plate A heretofore referred to as the additive-minuend plate, may be regarded as the primary element or plate, the additive-subtrahend plate likewise may be regarded as the secondary member or plate, and the plate $c$, as above indicated, may be mentioned as the solution indicator plate.

I claim:

1. In calculating mechanism of the character designated, the combination with a casing formed with sight openings, each adapted to display only a single character, of an initial-minuend number indicator plate, an additive-subtrahend indicator plate, a solution indicator plate, said plates being movably mounted, manual means for independent adjustment of the several plates, and an index plate actuated and controlled by one of said plates for indicating the character of the desired calculation, substantially as set forth.

2. In calculating mechanism of the character designated, the combination with a casing formed with sight openings, each adapted to display a single character, of an initial-minuend number indicator plate having thereon a series of characters, an additive-subtrahend number indicator plate having thereon two series of characters reading in opposite directions from an intermediate point, a solution indicator plate having thereon a series of characters of at least double the scope of the characters on the first mentioned plate and reading in the same direction, said plates being movably mounted in parallelism, and manual means for the adjustment of the plates independently of each other.

3. In a machine for demonstrating mathematical propositions, a primary character member, a secondary character member, a solution character member, and manual means for moving said members through distances according to the values of the respective characters thereon, including an index device movable automatically in connection with one of the character members for indicating the character of the computation.

4. In a calculating device of the character described, the combination with a casing, and mechanism therein comprising movable members than can be independently set to indicate a problem and the solution thereof, of signal means coacting with said mechanism, and a member movable to operate said signal means when the solution aforesaid is correct, said signal means and said member being movable into spaced relation with one another so that the signal means can not be operated by the member when the member is moved to the full extent provided.

5. A device as set forth in claim 4, wherein the signal means and the member are carried by said mechanism and casing respectively.

6. A device of the character described, including mechanism comprising movable members that can be independently set to indicate a problem and the solution thereof, a linkage operated by said mechanism on setting the latter, a swingable lever coacting with said linkage, and signal means co-operating with the lever to be made manifest only when the solution indicated is correct.

7. A device as set forth in claim 6 wherein said signal means is carried by said lever, a movable actuator being provided in relatively fixed relation to said signal means to make the same manifest.

8. A device of the character described, including mechanism comprising movable members that can be independently set to indicate a problem and the solution thereof, a signal coacting with said mechanism, and a member to render the signal manifest when the solution is correct, said member being spaced out of alinement with said mechanism to be unengageable therewith when the solution is incorrect.

9. A device of the character described, including a pair of problem setting parts, a solution setting part, a signal, a single member operative by the aforementioned parts, said member coacting with the signal, an actuator to make the signal manifest, and means co-operating with said parts to set the member to permit said actuator to function as aforesaid only when the solution is correct.

10. A device of the character described, including mechanism comprising movable members than can be independently set to indicate a problem and the solution thereof, a signal coacting with said mechanism, and a member carrying said signal, said member being movable by said mechanism to set the signal for manifestation of same when the solution is correct.

In testimony whereof I affix my signature.

MICHAEL S. GLEASON.